United States Patent
Watanabe

(10) Patent No.: US 10,466,946 B2
(45) Date of Patent: Nov. 5, 2019

(54) COMMUNICATION SYSTEM, PRINTING MEDIATION SERVER AND NON-TRANSITORY COMPUTER-READABLE MEDIUM FOR CONTROLLING HANDING OVER OF A PRINT JOB FROM A FIRST PRINTER TO A SECOND PRINTER TO COMPLETE THE PRINT JOB USING A TERMINAL DEVICE

(71) Applicant: BROTHER KOGYO KABUSHIKI KAISHA, Nagoya-shi, Aichi-ken (JP)

(72) Inventor: Satoshi Watanabe, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/895,470

(22) Filed: Feb. 13, 2018

(65) Prior Publication Data
US 2018/0232188 A1 Aug. 16, 2018

(30) Foreign Application Priority Data
Feb. 14, 2017 (JP) ................ 2017-025037

(51) Int. Cl.
G06F 13/14 (2006.01)
G06F 3/12 (2006.01)

(52) U.S. Cl.
CPC .......... *G06F 3/1292* (2013.01); *G06F 3/1203* (2013.01); *G06F 3/126* (2013.01);
(Continued)

(58) Field of Classification Search
CPC .... G06F 3/1292; G06F 3/1203; G06F 3/1261; G06F 3/0635
(Continued)

(56) References Cited

U.S. PATENT DOCUMENTS 5,729,268 A * 3/1998 Akimoto ............. G06K 15/129
347/119
2007/0147870 A1* 6/2007 Shindo ............... G03G 15/5012
399/82
(Continued)

FOREIGN PATENT DOCUMENTS

JP H06-187110 A 7/1994
JP 2009-031845 A 2/2009
(Continued)

OTHER PUBLICATIONS

Wi-Fi Peer-to-Peer (P2P) Technical Specification Version1.5.

*Primary Examiner* — Jamares Q Washington
(74) *Attorney, Agent, or Firm* — Scully, Scott, Murphy & Presser, P.C.

(57) ABSTRACT

A printing mediation server includes a controller configured to perform transmitting first print data representing images of plural pages to a first printer, controlling the first printer to perform printing based on the first print data, receiving, after the first print data is transmitted to the first printer, a stop notification transmitted from the first printer, when a stop instruction is transmitted from a terminal device to the first printer, receiving, after the stop notification is received from the first printer, a print data request transmitted from the second printer, when a restart instruction is transmitted from the terminal device to a second printer, transmitting, to the second printer, second print data including at least partial print data representing images of pages not printed, when the print data request is received from the second printer, and controlling the second printer to perform printing based on the second print data.

13 Claims, 6 Drawing Sheets

(52) U.S. Cl.
CPC .......... *G06F 3/1261* (2013.01); *G06F 3/1288* (2013.01); *G06F 3/1296* (2013.01)

(58) Field of Classification Search
USPC .............................................. 358/1.15, 1.14
See application file for complete search history.

(56) References Cited

U.S. PATENT DOCUMENTS

| | | | |
|---|---|---|---|
| 2010/0195144 A1* | 8/2010 | Kawai | G06F 3/1222 358/1.15 |
| 2016/0011835 A1* | 1/2016 | Igarashi | G06F 3/1292 358/1.15 |

FOREIGN PATENT DOCUMENTS

| | | | |
|---|---|---|---|
| JP | 2013-063579 A | 4/2013 | |
| JP | 2015-028730 A | 2/2015 | |

* cited by examiner

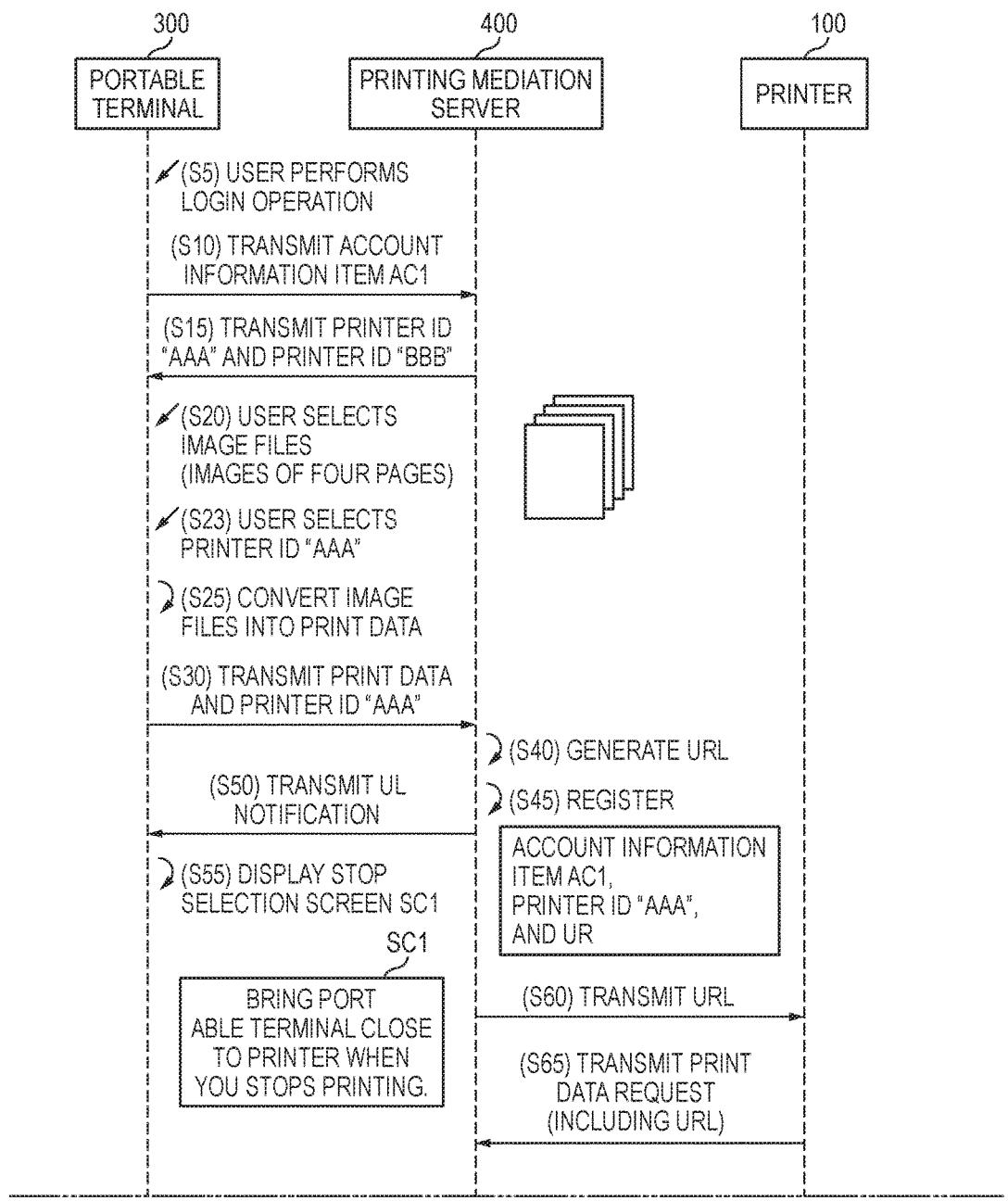

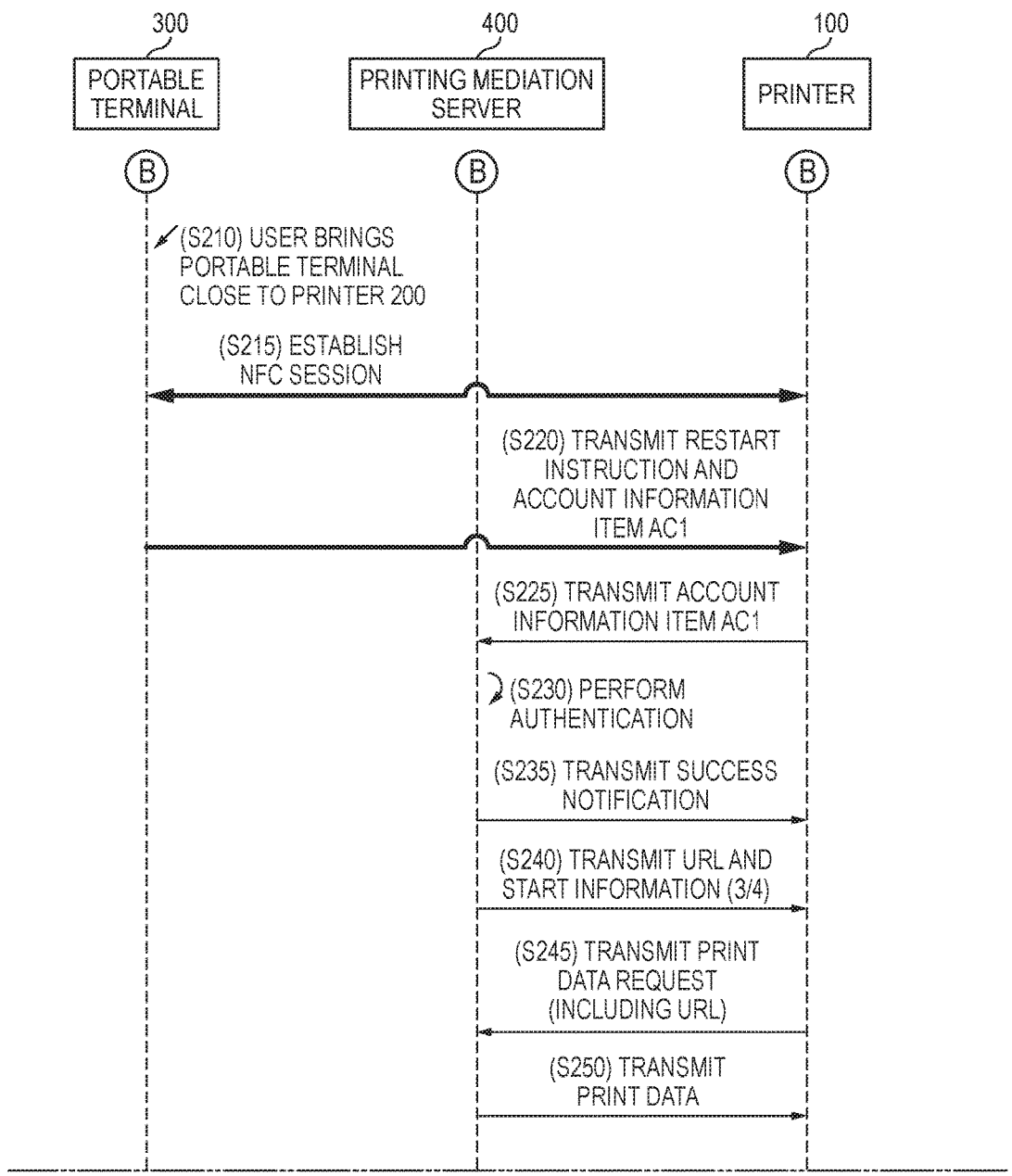

COMMUNICATION SYSTEM, PRINTING MEDIATION SERVER AND NON-TRANSITORY COMPUTER-READABLE MEDIUM FOR CONTROLLING HANDING OVER OF A PRINT JOB FROM A FIRST PRINTER TO A SECOND PRINTER TO COMPLETE THE PRINT JOB USING A TERMINAL DEVICE

CROSS-REFERENCE TO RELATED APPLICATION

This application claims priority from Japanese Patent Application No. 2017-025037 filed on Feb. 14, 2017, the entire subject-matter of which is incorporated herein by reference.

TECHNICAL FIELD

The disclosure relates a communication system that implements a printing operation.

BACKGROUND

There has been disclosed a system including a printer, a print server, and a client PC. When print data is uploaded from the client PC into the print server, the print server transmits the print data to the printer. As a result, the printer performs printing based on the print data.

The above-mentioned technology does not consider a situation in which it is required to stop printing in the middle of printing. For example, it is assumed a situation in which a user wants to make a certain printer stop printing based on print data in the middle of printing and make another printer restart printing based on the same print data. In this case, generally, the user should upload the corresponding print data into the printer server again.

SUMMARY

The specification discloses a technology capable of improving convenience for a user who operates stop a printing operation in the middle of printing and thereafter restart the printing operation.

One illustrative aspect provides a communication system including:
 a first printer;
 a second printer; and
 a printing mediation server,
 wherein the first printer comprises a first printing executing unit and a first controller configured to perform:
  receiving, from the printing mediation server, first print data representing images of M pages, the parameter "M" being an integer equal to or greater than 2;
  controlling the first printing executing unit to perform printing based on the first print data;
  receiving, before the printing of the images of the M pages is completed, a stop instruction for stopping the printing based on the first print data, the stop instruction being transmitted from a terminal device;
  supplying a stop command for stopping printing based on the first print data to the first printing executing unit, in a case where the stop instruction is received from the terminal device, the first printing executing unit completing printing of images of first to N-th pages out of the images of the M pages until the printing based on the first print data is stopped in response to the stop instruction, the first printing executing unit not performing printing of images of "N+1"-th to M-th pages in response to the stop command, and the parameter "N" being an integer equal to or greater than 1 and smaller than the parameter "M"; and
  transmitting, to the printing mediation server, a stop notification representing that the printing based on the first print data is stopped, and
 the second printer comprises a second printing executing unit and a second controller configured to perform:
  receiving, after the stop instruction is transmitted from the terminal device to the first printer, a restart instruction for restarting printing, the restart instruction being transmitted from the terminal device;
  transmitting, to the printing mediation server, a print data request for requesting a transmission of print data, in a case where the restart instruction is received from the terminal device;
  receiving, from the printing mediation server, second print data including at least partial print data representing the images of the "N+1"-th to M-th pages in a case where the print data request is transmitted to the printing mediation server; and
  controlling the second printing executing unit to perform printing based on the second print data, and
 the printing mediation server comprises a third controller configured to perform:
  transmitting the first print data to the first printer;
  receiving the stop notification from the first printer, after the first print data is transmitted to the first printer;
  receiving the print data request from the second printer, after the stop notification is received from the first printer; and
  transmitting the second print data to the second printer, in a case where the print data request is received from the second printer.

The aspect provides a printing mediation server including a controller configured to perform:
 transmitting first print data representing images of M pages to a first printer, the parameter "M" being an integer equal to or greater than 2;
 controlling the first printer to perform printing based on the first print data;
 receiving, after the first print data is transmitted to the first printer, a stop notification representing that the printing based on the first print data is stopped, the stop notification being transmitted from the first printer, in a case where a stop instruction for stopping the printing based on the first print data is transmitted from a terminal device to the first printer, the first printer completing printing of images of first to N-th pages out of the images of the M pages until the printing based on the first print data is stopped in response to the stop instruction, the first printer not performing printing of images of "N+1"-th to M-th pages in response to the stop instruction, and the parameter "N" being an integer equal to or greater than 1 and smaller than the parameter "M";
 receiving, after the stop notification is received from the first printer, a print data request for requesting a transmission of print data, the print data request being transmitted from the second printer, in a case where a restart instruction for restarting printing is transmitted from the terminal device to a second printer being different from the first printer;
 transmitting, to the second printer, second print data including at least partial print data representing images of "N+1"-th to M-th pages, in a case where the print data request is received from the second printer; and controlling the second printer to perform printing based on the second print data.

The aspect provides a non-transitory computer-readable medium having a computer program stored thereon and readably by a computer of a terminal device, the computer program, when executed by the computer, causes the terminal device to perform operations comprising:

transmitting first print data representing images of M pages to a printing mediation server, the parameter "M" being an integer equal to or greater than 2, and the first print data being transmitted from the printing mediation server to a first printer;

transmitting, to the first printer, a stop instruction for stopping printing based on the first print data, after the first print data is transmitted to the printing mediation server, the first printer completing printing of images of first to N-th pages out of the images of the M pages until the printing based on the first print data is stopped in response to the stop instruction, and the first printer not performing printing of images of "N+1"-th to M-th pages in response to the stop instruction, and the parameter "N" being an integer equal to or greater than 1 and smaller than the parameter "M"; and transmitting a restart instruction for restarting printing to a second printer being different from the first printer, after the stop instruction is transmitted to the first printer, the second printer transmitting a print data request for requesting print data to the printing mediation server in response to the restart instruction, the second printer receiving second print data including at least partial print data representing the images of the "N+1"-th to M-th pages from the printing mediation server, and the second printer performing printing based on the second print data.

According to the configuration of each of the communication system, the printing mediation server, and the non-transitory computer-readable medium, in the case where the user wants to stop printing in the middle of printing and restart printing, the user needs only to perform transmission of a stop instruction to the first printer and transmission of a restart instruction to the second printer with the terminal device such that the second printer performs printing, without uploading the first print data into the printing mediation server again. Therefore, it is possible to improve convenience for the user who operates to stop a printing operation in the middle of printing and thereafter restart the printing operation.

A control method, a computer program and a non-transitory computer-readable medium having the computer program stored thereon for implementing the communication system, are also new and useful. Further, a control method and a computer program for implementing the above-mentioned printing mediation server, and a computer-readable recording medium retaining the corresponding computer program are also new and useful. Furthermore, the above-mentioned terminal device, a control method for implementing the terminal device, and a computer-readable recording medium retaining a computer program for the terminal device are also new and useful.

BRIEF DESCRIPTION OF DRAWINGS

FIGS. 2A and 2B depict a part of a sequence diagram of a process in first illustrative embodiment.

FIGS. 4A and 4B depict a part of the sequence diagram of the process in the first illustrative embodiment.

DETAILED DESCRIPTION

Figure 1:
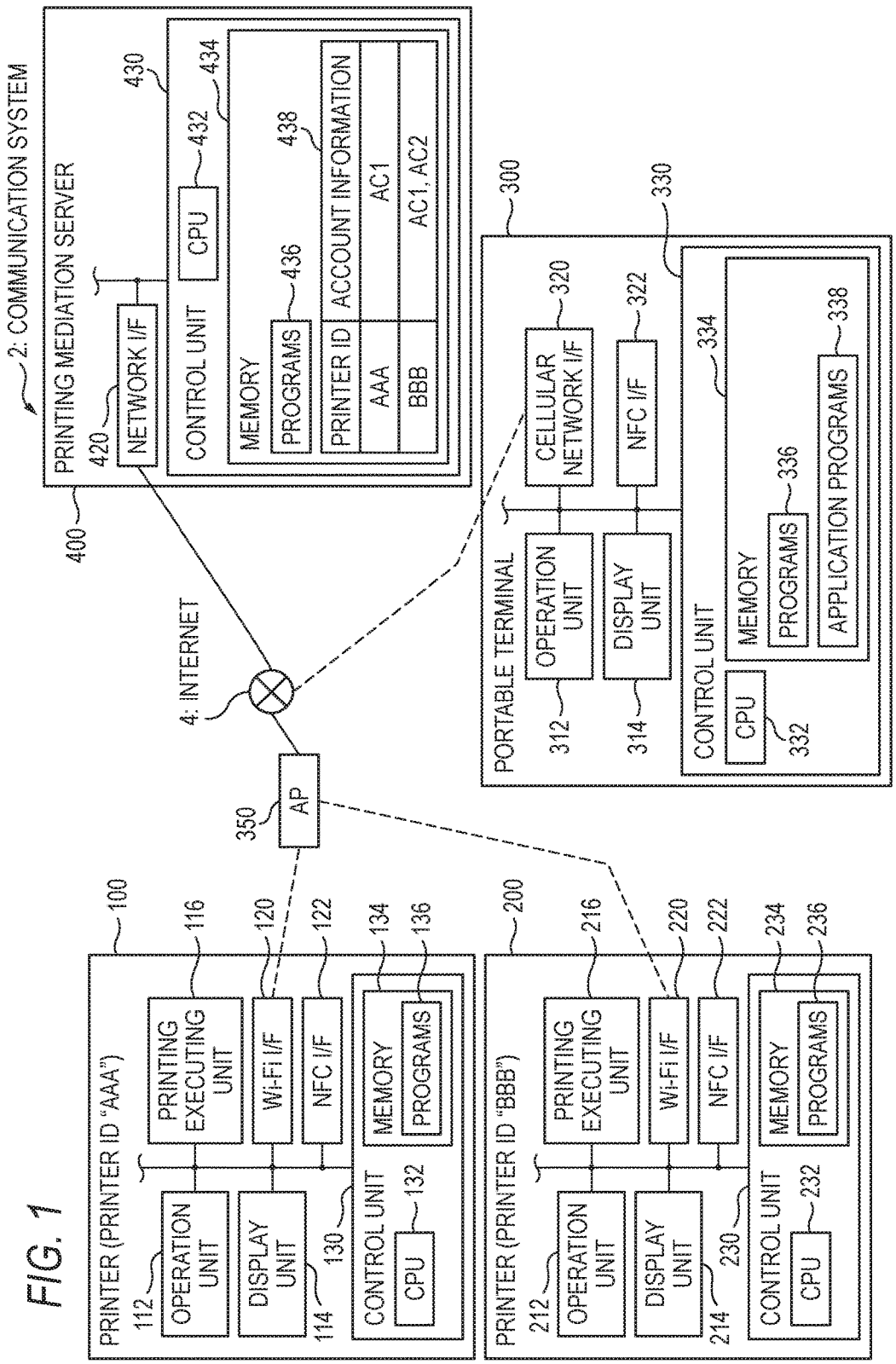
FIG. 1 depicts a configuration of a communication system.
Figure 2B:
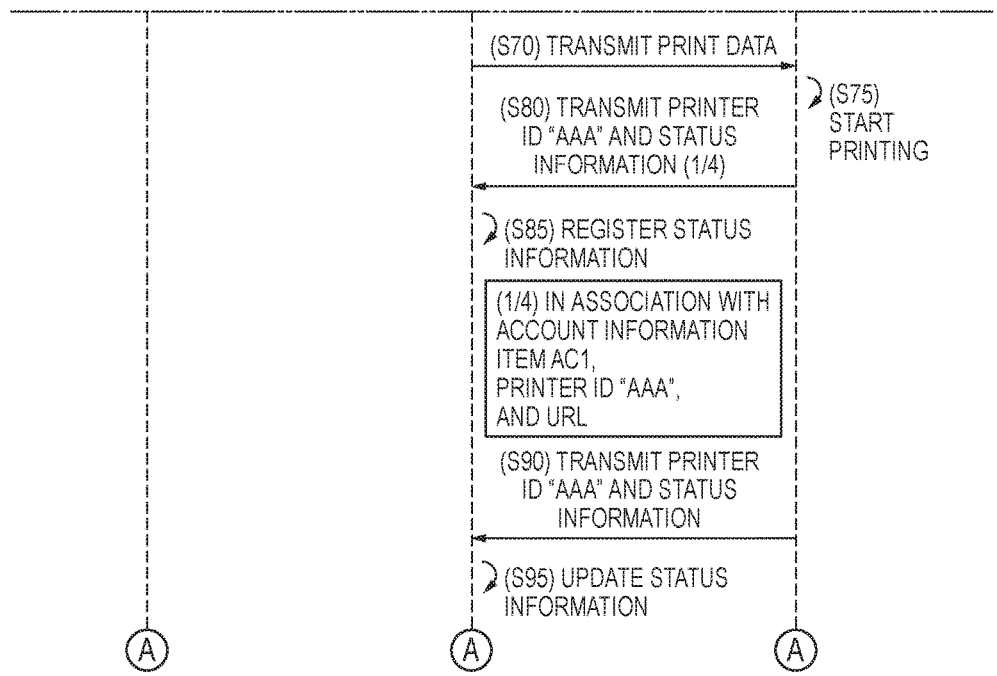

First Illustrative Embodiment (Configuration of Communication System 2; FIG. 1)

As shown in FIG. 1, a communication system 2 includes a plurality of printers 100 and 200, a portable terminal 300, and a printing mediation server 400. The individual devices 100 and 200 are connected to a wireless LAN (the abbreviation for Local Area Network) formed by an AP (the abbreviation for Access Point) 350. The individual devices 100 and 200 enable to perform communication with each other through the AP 350.

The printing mediation server 400 is installed on the Internet 4. The individual devices 100 and 200 enable to perform communication with the printing mediation server 400 on the Internet 4 through the AP 350.

(Configurations of Printers 100 and 200)

The individual printers 100 and 200 are peripheral devices capable of performing a printing function (i.e. peripheral devices of the portable terminal 300 or the like). The printer 100 has a printer ID "AAA" for identifying the printer 100. The printer 200 has a printer ID "BBB" for identifying the printer 200. The printer 100 has an operation unit 112, a display unit 114, a printing executing unit 116, a Wi-Fi interface 120, an NFC (the abbreviation for Near Field Communication) interface 122, and a control unit 130. The operation unit 112 has a plurality of keys. A user can input various instructions to the printer 100 by operating the operation unit 112. The display unit 114 is a display for displaying a variety of information. The display unit 114 also functions as a so-called touch panel (in other words, the display unit also functions as an operation unit). The printing executing unit 116 is a printing mechanism of an inkjet type, a laser type, or the like. Hereinafter, an interface will be referred to as an I/F.

The Wi-Fi I/F 120 is a wireless interface for performing Wi-Fi communication according to a Wi-Fi scheme. The Wi-Fi scheme is a wireless communication scheme for performing wireless communication, for example, according to the IEEE (the abbreviation for The Institute of Electrical and Electronics Engineers, Inc) 802.11 standard, and standards (for example, 802.11a, 11b, 11g, 11n, and so on) based on 802.11.

The NFC I/F 122 is an I/F for performing NFC according to an NFC scheme. The NFC scheme is a wireless communication scheme based on an international standard such as ISO/IEC 14443, 15693, 18092, or the like. Also, as I/F types for performing NFC, I/Fs called NFC forum devices and I/Fs called NFC forum tags are known. The NFC I/F 122 is an NFC forum device, and is an I/F capable of operating selectively in one of a P2P (the abbreviation for Peer to Pear) mode, an R/W (the abbreviation for Reader/Writer) mode, and a CE (the abbreviation for Card Emulation) mode.

Now, the difference between the Wi-Fi I/F 120 and the NFC I/F 122 will be described. The communication rate of Wi-Fi communication through the Wi-Fi I/F 120 (for example, the maximum rate of this communication is 11 Mbps to 600 Mbps) is higher than the communication rate of NFC through the NFC I/F 122 (for example, the maximum rate of this communication is 100 Kbps to 424 Kbps). Further, the frequency of carrier waves of Wi-Fi communication through the Wi-Fi I/F 120 (for example, a band of 2.4 GHz or a band of 5.0 GHz) is different from the frequency of carrier waves of NFC through the NFC I/F 122 (for example, a band of 13.56 MHz). Furthermore, a maximum distance (for example, at most about 100 m) within which Wi-Fi communication through the Wi-Fi I/F 120 enables to be performed is larger than a maximum distance within which NFC through the NFC I/F 122 enables to be performed (for example, at most about 10 cm).

The control unit 130 has a CPU 132 and a memory 134. The CPU 132 performs various processes according to programs 136 stored in the memory 134. The memory 134 is configured with a ROM, a RAM, a hard disk, and so on. Individual units 212 to 236 of the printer 200 are the same as the individual units 112 to 136 of the printer 100.

(Configuration of Portable Terminal 300)

The portable terminal 300 is a portable terminal device such as a portable phone (for example, a smart phone), a PDA, a laptop, a tablet PC, a portable music player, or a portable video player. The portable terminal 300 has an operation unit 312, a display unit 314, a cellular network I/F 320, an NFC I/F 322, and a control unit 330. Hereinafter, a network will also be referred to as a NW.

The operation unit 312 has a plurality of keys. The user can give various instructions to the portable terminal 300 by operating the operation unit 312. The display unit 314 is a display for displaying a variety of information. The display unit 314 also functions as a so-called touch panel (in other words, the display unit also functions as an operation unit). The cellular NW I/F 320 is an I/F for performing wireless communication according to a cellular scheme (such as a 3G scheme or a 4G scheme). The NFC I/F 322 is an NFC forum device.

The control unit 330 has a CPU 332 and a memory 334. The CPU 332 is a processor for performing various processes according to programs 336 and 338 stored in the memory 334. The memory 334 is configured with a RAM, a ROM, a hard disk, and so on. The memory 334 retains not only an OS (the abbreviation for Operating System) program 336 for implementing basic processes but also application programs 338 (hereinafter, referred to as applications 338). The applications 338 are provided by the vendor of the printers 100 and 200, and may be installed from a server (not shown in the drawings) on the Internet 4 into the portable terminal 300, or may be installed from media shipped with the printers 100 and 200 into the portable terminal 300.

(Configuration of Printing Mediation Server 400)

The printing mediation server 400 is installed on the Internet 4 by the vendor of the printers 100 and 200, and is a server for mediating performance of the printing functions of the printers 100 and 200.

The printing mediation server 400 has a network I/F 420 and a control unit 430. The network I/F 420 is connected to the Internet 4.

The control unit 430 has a CPU 432 and a memory 434. The CPU 432 performs various processes according to programs 436 stored in the memory 434. The memory 434 is configured with a RAM, a ROM, a hard disk, and so on. The memory 434 retains not only the programs 436 but also a table 438. The table 438 retains printer IDs for identifying printers, and account information items for identifying users permitted to use the corresponding printers, in association with each other. In the example of FIG. 1, the table 438 retains the printer ID "AAA" of the printer 100 and an account information item AC1 associated with each other, and retains the printer ID "BBB" of the printer 200 and account information items AC1 and AC2 associated with each other.

(Processes which are Performed by Individual Devices 100, 200, 300 and 400; FIGS. 2A to 4B)

With reference to FIGS. 2A to 4B, processes which are performed by the individual devices such as the device 100 will be described. In the following description, in order to facilitate understanding, when processes which the CPUs 132, 232, 332, and 432 of the individual devices 100, 200, 300, and 400 perform according to the programs 136, 236, 338, and 436 are described, the CPUs are not written as the agents, and the devices (for example, the printer 100) are written as the agents. Further, in FIGS. 2A to 4B, NFC which is performed between the portable terminal 300 and the printer 100 or 200 is shown by thick arrows.

In S5, the user of the portable terminal 300 performs a login operation for logging in to the printing mediation server 400, on the portable terminal 300. The login operation includes an operation of inputting the account information item AC1 for identifying the user of the portable terminal 300.

In S10, the portable terminal 300 transmits the account information item AC1 to the printing mediation server 400 through the cellular NW I/F 320.

When the printing mediation server 400 receives the account information item AC1 from the portable terminal 300 through the network I/F 420, in S15, the printing mediation server transmits the printer IDs "AAA" and "BBB" stored in the table 438 in association with the account information item AC1, to the portable terminal 300 through the network I/F 420.

When the portable terminal 300 receives the printer IDs "AAA" and "BBB" through the cellular NW I/F 320, it controls the display unit 314 to display a file selection screen for selecting image files as print objects. In S20, the user selects image files representing images of four pages.

Subsequently, the portable terminal 300 controls the display unit 314 to display a printer selection screen for selecting a printer to perform printing. The printer selection screen includes the received printer IDs "AAA" and "BBB". In S23, the user selects the printer ID "AAA" of the printer 100 to perform printing.

In S25, the portable terminal 300 converts the selected image files, thereby generating print data having a data format which the printers 100 and 200 enable to interpret.

In S30, the portable terminal 300 transmits the print data and the printer ID "AAA" to the printing mediation server 400 through the cellular NW I/F 320.

When the printing mediation server 400 receives the print data and the printer ID "AAA" from the portable terminal 300 through the network I/F 420, it registers the print data in the memory 434. Then, in S40, the printing mediation server 400 generates an URL representing the location of the print data in the printing mediation server 400. Next, in S45, the printing mediation server registers the account information item AC1, the printer ID "AAA", and the URL in the memory 434 in association with one another.

In S50, the printing mediation server 400 transmits a UL notification representing that uploading of the print data has succeeded, to the portable terminal 300 through the network I/F 420.

When the portable terminal 300 receives the UL notification from the printing mediation server 400 through the cellular NW I/F 320, in S55, the portable terminal controls the display unit 314 to display a stop selection screen SC1. The stop selection screen SC1 includes a message urging the user to bring the portable terminal 300 close to a printer performing printing based on the transmitted print data when the user wants to stop a printing operation.

In S60, the printing mediation server 400 transmits the URL to the printer 100 identified by the selected printer ID "AAA", through the network I/F 420.

When the printer 100 receives the URL from the printing mediation server 400 through the Wi-Fi I/F 120, in S65, it transmits a print data request for requesting print data transmission, to the printing mediation server 400 through the Wi-Fi I/F 120. The print data request includes the URL.

When the printing mediation server 400 receives the print data request from the printer 100 through the network I/F 420, in S70, it transmits the print data specified by the URL included in the print data request, to the printer 100 through the network I/F 420.

When the printer 100 receives the print data from the printing mediation server 400 through the Wi-Fi I/F 120, in S75, it controls the printing executing unit 116 to perform printing based on the print data. When the printer 100 completes printing of an image of the first page out of the images of the four pages represented by the print data, in S80, it transmits the printer ID "AAA" and status information to the printing mediation server 400 through the Wi-Fi I/F 120. Status information is information representing the progress status of printing, and is transmitted to the printing mediation server 400 whenever one page image is printed. The status information of S80 is information representing that printing of the image of the first page of the images of the four pages has been completed.

When the printing mediation server 400 receives the printer ID "AAA" and the status information from the printer 100 through the network I/F 420, in S85, it registers the status information in the memory 434 in association with the account information item AC1, the printer ID "AAA", and the URL.

When the printer 100 completes printing of images of the first and second pages out of the images of the four pages, in S90, it transmits the printer ID "AAA" and status information representing that printing of the images of the first and second pages out of the images of the four pages has been completed, to the printing mediation server 400 through the Wi-Fi I/F 120.

When the printing mediation server 400 receives the printer ID "AAA" and the status information from the printer 100 through the network I/F 420, in S95, it updates the registered status information with the newly received status information.

Figure 3:
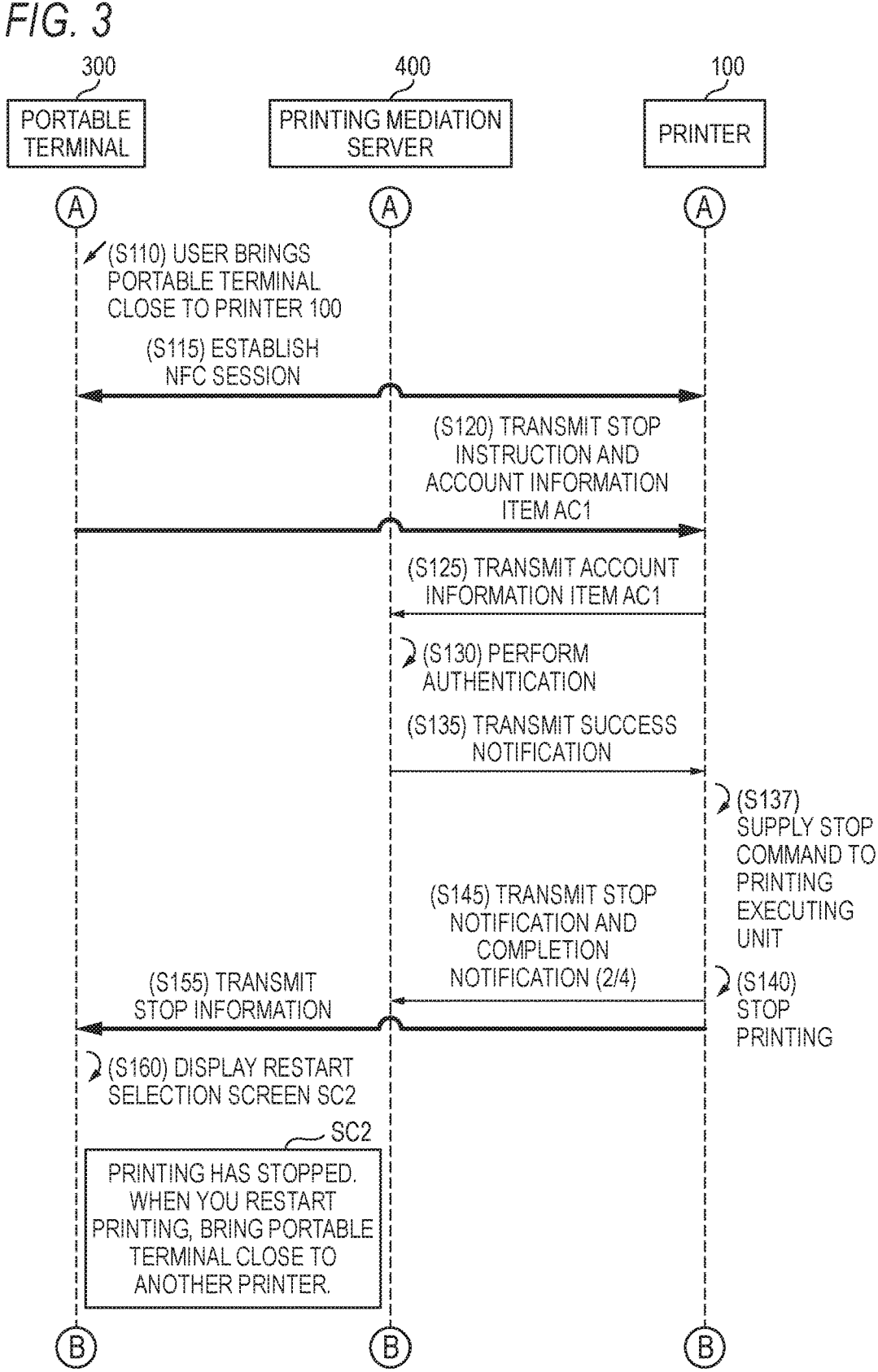
FIG. 3 depicts a part of the sequence diagram of the process in the first illustrative embodiment.

In the case where the user wants to stop a printing operation of the printer 100, in S110 of FIG. 3, the user brings the portable terminal 300 close to the printer 100. When the distance between the NFC I/F 322 of the portable terminal 300 and the NFC I/F 122 of the printer 100 becomes smaller than the maximum distance (for example, 10 cm) within which NFC enables to be performed, in S115, an NFC session is established between the NFC I/Fs 322 and 122.

In S120, using the NFC session, the portable terminal 300 transmits the account information item AC1 and a stop instruction for stopping printing based on the print data, to the printer 100 through the NFC I/F 322. At the time when S120 is performed, printing of the images of the first and second pages out of the images of the four pages has been completed, and printing of images of the third and fourth pages has not been performed.

When the printer 100 receives the stop instruction and the account information item AC1 from the portable terminal 300 through the NFC I/F 122 using the NFC session, in S125, it transmits the account information item AC1 to the printing mediation server 400 through the Wi-Fi I/F 120.

When the printing mediation server 400 receives the account information item AC1 from the printer 100 through the network I/F 420, in S130, it performs authentication. Specifically, since the account information item AC1 received in S125 coincides with the account information item AC1 registered in S45, the printing mediation server 400 determines that authentication has succeeded. In S135, the printing mediation server 400 transmits a success notification representing that authentication has succeeded, to the printer 100 through the network I/F 420.

When the printer 100 receives the success notification from the printing mediation server 400 through the Wi-Fi I/F 120, in S137, it supplies a stop command for stopping printing based on the print data, to the printing executing unit 116. As described above, after authentication succeeds, the printer 100 supplies the stop command to the printing executing unit 116. Therefore, it is possible to prevent people other than the user of the portable terminal 300 from stopping printing in a status where the user has instructed the printer 100 to perform printing.

In S140, the printing executing unit 116 of the printer 100 stops performance of printing based on the print data. Although the printing executing unit 116 has completed printing of the images of the first and second pages, in response to the stop command, the printing executing unit 116 does not perform printing of the images of the third and fourth pages until printing is stopped. Also, in a modification, it is assumed a situation where an error (for example, a paper jam) occurs in the printer 100 at the time when the printer 100 has completed printing of the images of the first and second pages (S90 of FIG. 2B), whereby printing stops. In this situation, in S140, in response to the stop command, the printer 100 cancels a print job corresponding to the stopped printing.

In S145, the printer 100 transmits a stop notification representing that printing based on the print data has stopped, and a completion notification representing that printing of the images of the first and second pages has been completed, to the printing mediation server 400 through the Wi-Fi I/F 120. The printing mediation server 400 receives the stop notification and the completion notification from the printer 100 through the network I/F 420. On the basis of the reception of the completion notification, the printing mediation server 400 enables to recognize that printing of the images of the first and second pages has been completed and printing of the images of the third and fourth pages has not been performed.

In S155, the printer 100 transmits stop information representing that printing based on the print data has stopped, to the portable terminal 300 through the NFC I/F 122 using the NFC session.

Also, in a modification, in S155, the following process may be performed. In the corresponding modification, the Wi-Fi I/F 120 of the printer 100 supports a WFD (the abbreviation for Wi-Fi Direct (registered as a trade mark) scheme set by the Wi-Fi Alliance. The WFD scheme is a wireless communication scheme described in a specification "Wi-Fi Peer-to-Peer (P2P) Technical Specification Version 1.5" made by the Wi-Fi Alliance. Also, the portable terminal 300 has a Wi-Fi I/F supporting the WFD scheme. In S120, the portable terminal 300 further transmits connection information for establishing a WFD connection according to the WFD scheme, to the printer 100, and establishes a WFD connection with the printer 100, using the connection information. Then, in S155, the printer 100 transmits the stop information to the portable terminal 300 through the Wi-Fi I/F 120. The portable terminal 300 receives the stop information from the printer 100 through the Wi-Fi I/F.

Also, in another modification, instead of the printer 100, the printing mediation server 400 transmits the stop information to the portable terminal 300 through the network I/F 420. The portable terminal 300 receives the stop information from the printing mediation server 400 through the cellular NW I/F 320.

When the portable terminal 300 receives the stop information from the printer 100 through the NFC I/F 322, in S160, it controls the display unit 314 to display a restart selection screen SC2. The restart selection screen SC2 includes a message urging the user to bring the portable terminal 300 close to a printer different from the printer 100 when the user wants to make the different printer restart printing stopped in the printer 100.

S210 and S215 of FIG. 4A are identical to S110 and S115 except that instead of the printer 100, the printer 200 is the agent which performs those processes. In S220, using the NFC session, the portable terminal 300 transmits the account information item AC1 and a restart instruction for restarting printing based on the print data, to the printer 200 through the NFC I/F 322. The printer 200 receives the restart instruction and the account information item AC1 from the portable terminal 300 through the NFC I/F 222 using the NFC session. As described above, in the case where the user wants to make the printer 200 restart printing, the user needs only to bring the portable terminal 300 close to the printer 200 to restart printing. Therefore, for example, as compared to a configuration in which the user selects the printer ID of a printer to restart printing from a printer ID list displayed on the portable terminal 300, the user can easily select a printer to restart printing.

S225 to S235 are identical to S125 to S135 of FIG. 3 except that instead of the printer 100, the printer 200 is the agent which performs those processes.

In S240, the printing mediation server 400 transmits the URL and start information representing that printing should be started from the third page image, to the printer 200 through the network I/F 420. The page number (i.e. page No. 3) represented by the start information is a page number determined by adding one page to the page number (i.e. page No. 2) represented by the completion information of S145.

When the printer 200 receives the URL and the start information from the printing mediation server 400 through the Wi-Fi I/F 220, in S245, it transmits a print data request including the URL, to the printing mediation server 400 through the Wi-Fi I/F 220. As described above, after authentication succeeds, the printer 100 transmits the print data request to the printing mediation server 400. Therefore, it is possible to prevent people other than the user of the portable terminal 300 from restarting printing after the user stops printing in the printer 100.

When the printing mediation server 400 receives the print data request from the printer 200 through the network I/F 420, in S250, it transmits the print data specified by the URL, to the printer 200 through the network I/F 420.

When the printer 200 receives the print data from the printing mediation server 400 through the Wi-Fi I/F 220, in S255, it transmits a restart notification representing that printing based on the print data has restarted, to the portable terminal 300 through the NFC I/F 222, using the NFC session.

When the portable terminal 300 receives the restart notification from the printer 200 through the NFC I/F 322 using the NFC session, in S257, it controls the display unit 314 to display the stop selection screen SC1.

In S260, the printer 200 controls the printing executing unit 216 to perform printing of the images of the third and fourth pages based on the print data and the start information of S240, without controlling the printing executing unit 216 to perform printing of the images of the first and second pages out of the images of the four pages. In other words, only printing of the images of the third and fourth pages represented by the start information is performed. As a result, the user of the portable terminal 300 can obtain the printouts of the first and second pages from the printer 100, and can obtain the printouts of the third and fourth pages from the printer 200. As described above, the printers 100 and 200 do not print an image of the same page twice. Therefore, it is possible to reduce the consumption of print media.

When printing of the image of the first to third pages out of the images of the four pages is completed, in S265, the printer 200 transmits the printer ID "BBB" and status information representing that printing of the images of the first to third pages out of the images of the four pages has been completed, to the printing mediation server 400 through the Wi-Fi I/F 220.

When the printing mediation server 400 receives the printer ID "BBB" and the status information from the printer 200 through the network I/F 420, in S267, it updates the registered status information with the newly received status information.

S270 and S275 are identical to S265 and S267 except that the status information is information representing that printing of the images of the first to fourth pages has been completed.

In S280, the printing mediation server 400 transmits a completion information representing that printing of all page images has been completed, to the portable terminal 300 through the network I/F 420. The portable terminal 300 receives the completion notification from the printing mediation server 400 through the cellular NW I/F 320.

Advantages of the First Illustrative Embodiment

According to the first illustrative embodiment, when the printer 100 receives the print data representing the images of the four pages from the printing mediation server 400 (S70 of FIG. 2B), it performs printing (S75). When the printer 100 receives the stop instruction from the portable terminal 300 before printing is completed (S120 of FIG. 3), it transmits the stop notification to the printing mediation server 400 (S145). Although the printer 100 has completed printing of the images of the first and second pages, the printer 100 does not perform printing of the images of the third and fourth pages until printing based on the print data is stopped. After the stop instruction is transmitted from the portable terminal 300 to the printing executing unit 116, when the printer 200 receives the restart instruction from the portable terminal 300 (S220 of FIG. 4A), it transmits the print data request to the printing mediation server 400 (S245), and receives the print data from the printing mediation server 400 (S250), and performs printing of the images of the third and fourth pages (S260). In other words, in the case where the user wants to stop a printing operation in the middle of printing and thereafter restart the printing operation, the user needs only to perform transmission of the stop instruction to the printer 100 and transmission of the restart instruction to the printer 200, and does not need to upload the print data to the printing mediation server 400 again in order to perform printing in the printer 200. Therefore, it is possible to improve convenience for the user who operates stop a printing operation in the middle of printing and thereafter restart the printing operation.

The printers 100 and 200, the printing executing units 116 and 216, and the NFC I/Fs 122 and 222 are examples of a first printer, a second printer, a first printing executing unit, a second printing executing unit, a first wireless interface, and a second wireless interface, respectively. The account information item AC1, the start information, and the completion information are examples of user identification information, first status information, and second status information, respectively.

S30 of FIG. 2A is an example of a process which is performed by a first data receiving unit and a data transmitting unit. S70 and S75 are examples of processes which are performed by a first data transmitting unit and a first printing control unit, respectively. S120 of FIG. 3 is an example of a process which is performed by a stop instruction receiving unit and a stop instruction transmitting unit. S125 is an example of a process which is performed by a first identification information transmitting unit, an identification information receiving unit, and a first identification information receiving unit. S130 is an example of a process which is performed by a first authentication unit and an authentication unit. S135 is an example of a process which is performed by a first success notification receiving unit, a first success notification transmitting unit, and a success notification transmitting unit. S137, S145, and S155 are examples of processes which are performed by a stop command supplying unit, a stop notification transmitting unit, and a stop information transmitting unit, respectively. S220 of FIG. 4A is an example of a process which is performed by a restart instruction receiving unit and a restart instruction transmitting unit. S225 is an example of a process which is performed by a second identification information transmitting unit and a second identification information receiving unit. S240 is an example of a process which is performed by a status transmitting unit and a status receiving unit. S230 is an example of a process which is performed by a second authentication unit. S235 is an example of a process which is performed by a second success notification receiving unit and a second success notification transmitting unit. S245 is an example of a process which is performed by a request transmitting unit and a request receiving unit. S250 is an example of a process which is performed by a second data receiving unit and a second data transmitting unit. S260 is an example of a process which is performed by a second printing control unit.

Although the specific examples of the disclosure have been described in detail, they are just exemplary and are not construed to limit the claims. The technology described in the claims includes a variety of changes and modifications to the above specific examples. Modified embodiments of the above first illustrative embodiment are described in the below.

Modifications to the First Illustrative Embodiment

Modified Embodiment 1

In the above-described embodiment, in S240 of FIG. 4A, the printing mediation server 400 transmits the URL and the start information representing that printing should be started from the third page, to the printer 200. However, instead of this process, the following process may be performed. In other words, the printing mediation server 400 specifies a page number (i.e. page No. 3) determined by adding one page to the page number (i.e. page No. 2) represented by the completion information of S145 of FIG. 3, and generates specific print data representing images of the specified third page and the subsequent page, on the basis of the print data of S30 of FIG. 2A. Then, the printing mediation server 400 generates a specific URL representing the location of the specific print data, and transmits the specific URL to the printer 200. In S245 of FIG. 4A, the printing mediation server 400 receives a printing request including the specific URL from the printer 200. Then, in S250, the printing mediation server transmits the specific print data specified by the specific URL, to the printer 200. In other words, second print data may be partial print data representing images of the N+1 to M pages. The parameter "M" is an integer equal to or greater than 2, and the parameter "N" is an integer equal to or greater than 1 and smaller than the parameter "M."

Modified Embodiment 2

The portable terminal 300 may have a Wi-Fi I/F, and may be connected to the wireless LAN formed by the AP 350. Then, in S120 and S155 of FIG. 3, the printer 100 may perform wireless communication with the portable terminal 300 through the Wi-Fi I/F 120, and in S220 and S255 of FIG. 4B, the printer 200 may perform wireless communication with the portable terminal 300 through the Wi-Fi I/F 220. In this case, a first wireless connection may be established before printing starts, and a second wireless connection may be established before the stop instruction is transmitted from the terminal device to the first printer. Also, each of the first wireless interface and the second wireless interface may not be an I/F for performing near field communication.

Modified Embodiment 3

In S120 of FIG. 3, the portable terminal 300 may not transmit the account information item AC1, and S125 to S135 may be omitted. In other words, the first identification information transmitting unit, the first success notification receiving unit, the first identification information receiving unit, the identification information receiving unit, the first authentication unit, the authentication unit, the first success notification transmitting unit, and the success notification transmitting unit may be omitted.

Modified Embodiment 4

The printing mediation server 400 may generate a token corresponding to the account information item AC1 of S10 of FIG. 2A, and may use the token in place of the account information item AC1 in S45 and the subsequent processes. In other words, the user identification information may be, for example, a token.

Modified Embodiment 5

The printing mediation server 400 may not receive the completion information from the printer 100 in S145 of FIG. 3, and may not transmit the start information to the printer 200 in S240 of FIG. 4A, and the printer 200 may perform printing of the first to fourth page images in S260. In other words, the second print data may be the same as the first print data. Also, the status transmitting unit and the status receiving unit may be omitted.

Modified Embodiment 6

Figure 4B:
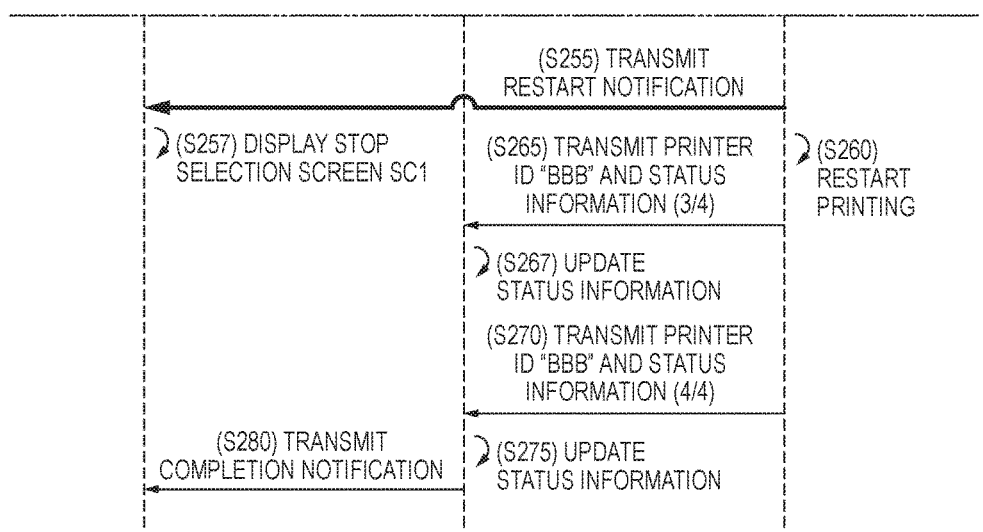

The individual devices 100, 200, and 300 may have, for example, I/Fs for performing "TranferJet (Trade mark)" communication or infrared communication, in place of the NFC I/Fs 122, 222, and 322, and in S120 and S155 of FIG. 3 and S220 and S255 of FIG. 4B, TranferJet communication or infrared communication may be performed. In other words, near field communication is not limited to NFC, and may be TranferJet communication, infrared communication, or the like.

Modified Embodiment 7

The portable terminal 300 may not transmit the account information item AC1 in S220 of FIG. 4A, and S225 to S235 may be omitted. In other words, the second identification information transmitting unit, the second success notification receiving unit, the second identification information receiving unit, the second authentication unit, and the second success notification transmitting unit may be omitted.

Modified Embodiment 8

The printer 100 may not transmit the stop information to the portable terminal 300 in S155 of FIG. 155, and the portable terminal 300 may display the restart selection screen SC2 in S160 if S120 is performed. In other words, the stop information transmitting unit may be omitted.

Modified Embodiment 9

In the above-described embodiment, the CPUs 132, 232, 332, and 432 of the individual devices 100, 200, 300, and 400 execute the programs 136, 236, 338, and 436 (i.e. software), whereby the individual processes of FIGS. 2A to 4B are implemented. However, at least one process of the individual processes of FIGS. 2A to 4B may be implemented by hardware such as a logic circuit.

Also, the technical elements described in the specification or drawings exhibit the technical usefulness individually or by a variety of combinations and are not limited to combinations defined in the claims at the time of the filing of the subject application. Also, the technologies described in the specification or drawings accomplish a plurality of purposes at the same time, and one accomplishment of the purposes also has the technical usefulness.

What is claimed is:

1. A communication system comprising:
a first printer;
a second printer; and
a printing mediation server,
wherein the first printer comprises a first printing executing unit and a first controller configured to perform:
  receiving, from the printing mediation server, first print data representing images of M pages, the parameter "M" being an integer equal to or greater than 2;
  controlling the first printing executing unit to perform printing based on the first print data;
  receiving, before the printing of the images of the M pages is completed, a stop instruction for stopping the printing based on the first print data, the stop instruction being transmitted from a mobile terminal device, the stop instruction comprising an identifier of a user of the mobile terminal device;
  supplying a stop command for stopping printing based on the first print data to the first printing executing unit, in a case where the stop instruction is received from the mobile terminal device, the first printing executing unit completing printing of images of first to N-th pages out of the images of the M pages until the printing based on the first print data is stopped in response to the stop instruction, the first printing executing unit not performing printing of images of "N+1"-th to M-th pages in response to the stop command, and the parameter "N" being an integer equal to or greater than 1 and smaller than the parameter "M"; and
  transmitting, to the printing mediation server, a stop notification representing that the printing based on the first print data is stopped, the stop notification comprising the identifier received from the mobile terminal device, and
the second printer comprises a second printing executing unit and a second controller configured to perform:
  receiving, after the stop instruction is transmitted from the mobile terminal device to the first printer, a restart instruction for restarting printing, the restart instruction being transmitted from the mobile terminal device, the restart instruction comprising the identifier of the user of the mobile terminal device;
  transmitting, to the printing mediation server, a print data request for requesting a transmission of print data, in a case where the restart instruction is received from the mobile terminal device, the print data request comprising the identifier received from the mobile terminal device;
  receiving, from the printing mediation server, second print data including at least partial print data representing the images of the "N+1"-th to M-th pages in a case where the print data request is transmitted to the printing mediation server; and
  controlling the second printing executing unit to perform printing based on the second print data, and
the printing mediation server comprises a third controller configured to perform:
  transmitting the first print data to the first printer;
  receiving the stop notification from the first printer, after the first print data is transmitted to the first printer;
  receiving the print data request from the second printer, after the stop notification is received from the first printer; and
  transmitting the second print data to the second printer, in a case where the print data request is received from the second printer.

2. The communication system according to claim 1,
wherein the first printer further comprises a first wireless interface configured to establish a first wireless connection with the mobile terminal device after printing of the images of the M pages starts and before the printing of the images of the M pages completes,
wherein the receiving of the stop instruction in the first printer comprises:
  receiving, before the printing of the images of the M pages completes, the stop instruction from the mobile terminal device through the first wireless interface with using the first wireless connection,
wherein the second printer further comprises a second wireless interface configured to establish a second wireless connection with the mobile terminal device after the stop instruction is transmitted from the mobile terminal device to the first printer, and wherein the receiving of the restart instruction in the second printer comprises:
receiving the restart instruction from the mobile terminal device through the second wireless interface with using the second wireless connection.

3. The communication system according to claim 1, wherein the first controller is configured to further perform receiving a first success notification representing that authentication using user identification information succeeds in a case where the identifier matching an identifier stored is transmitted to the printing mediation server, the first success notification information being transmitted from the printing mediation server,
wherein the stop command is supplied when a match is determined, and
wherein the third controller is configured to further perform:
receiving the identifier from the first printer;
performing the authentication using the identifier received from the first printer; and
transmitting the first success notification to the first printer in a case where the authentication succeeds.

4. The communication system according to claim 1, wherein the third controller is configured to further perform:
transmitting, after the stop notification is received from the first printer, first status information representing that the printing of the images of the first to N-th pages completes to the second printer,
wherein the second controller is configured to further perform:
receiving the first status information from the printing mediation server, and
wherein the controlling of the second printing executing unit in the second printer comprises:
controlling the second printing executing unit to perform the printing of the images of the "N+1"-th to the M-th pages according to the second print data and the first status information, without controlling the second printing executing unit to perform printing of the images of the first to N-th pages out of the images of the M pages.

5. The communication system according to claim 4, wherein the transmitting of the stop notification in the first printer comprises:
transmitting, to the printing mediation server, the stop notification and second status information representing that the printing of the images of the first to N-th pages completes,
wherein the receiving of the stop notification in the printing mediation server comprises:
receiving the stop notification and the second status information from the first printer, and
wherein the transmitting of the first status information in the printing mediation server comprises:
transmitting, after the stop notification is received from the first printer, the first status information determined according to the second status information to the second printer.

6. The communication system according to claim 1, wherein the first printer further comprises a first wireless interface performing near field communication,
wherein the receiving of the stop instruction in the first printer comprises:

receiving, before the printing of the images of the M pages completes, the stop instruction from the mobile terminal device through the first wireless interface,
wherein the second printer further comprises a second wireless interface performing near field communication, and
wherein the receiving of the restart instruction in the second printer comprises:
receiving, after the stop instruction is transmitted from the mobile terminal device to the first printer, the restart instruction from the mobile terminal device through the second wireless interface.

7. The communication system according to claim 1, wherein the second controller is configured to further perform receiving a second success notification representing that authentication using the identifier succeeds, the second success notification being transmitted from the printing mediation server, in a case where the identifier received from the mobile terminal device and subsequently transmitted from the second printer matches the stored identifier,
wherein the third controller is configured to perform:
receiving the identifier from the second printer;
authenticating with using the identifier received from the second printer; and
transmitting the second success notification to the second printer, in a case where the authentication succeeds.

8. The communication system according to claim 1, wherein the first controller is configured to perform:
transmitting, to the mobile terminal device, stop information representing that the printing based on the first print data is stopped.

9. A printing mediation server comprising a controller configured to perform:
transmitting first print data representing images of M pages to a first printer, the parameter "M" being an integer equal to or greater than 2;
controlling the first printer to perform printing based on the first print data;
receiving, after the first print data is transmitted to the first printer, a stop notification representing that the printing based on the first print data is stopped, the stop notification being transmitted from the first printer, in a case where a stop instruction for stopping the printing based on the first print data is transmitted from a mobile terminal device to the first printer, the first printer completing printing of images of first to N-th pages out of the images of the M pages until the printing based on the first print data is stopped in response to the stop instruction, the first printer not performing printing of images of "N+1"-th to M-th pages in response to the stop instruction, and the parameter "N" being an integer equal to or greater than 1 and smaller than the parameter "M", the stop notification comprising an identifier received from the mobile terminal device in the stop instruction, the identifier being of a user of the mobile terminal device;
receiving, after the stop notification is received from the first printer, a print data request for requesting a transmission of print data, the print data request being transmitted from the second printer, in a case where a restart instruction for restarting printing is transmitted from the mobile terminal device to a second printer being different from the first printer, the print data request comprising the identifier received from the mobile terminal device in the restart instruction;

transmitting, to the second printer, second print data including at least partial print data representing images of "N+1"-th to M-th pages, in a case where the print data request is received from the second printer; and controlling the second printer to perform printing based on the second print data.

10. The printing mediation server according to claim 9, wherein the controller is configured to further perform:

authenticating with using the identifier received from the first printer; and transmitting, to the first printer, a success notification representing that the authentication using the identifier succeeds, in a case where the authentication succeeds, and wherein in the first printer, in a case where the success notification is received, a stop command for stopping the printing based on the first print data is supplied to a printing executing unit of the first printer.

11. The printing mediation server according to claim 9, wherein the controller is configured to further perform:

transmitting, after the stop notification is received from the first printer, first status information representing that printing of the images of the first to N-th pages completes to the second printer; and controlling the second printer to perform printing of the images of the "N+1"-th to M-th pages, without controlling the second printer to perform printing of the images of the first to N-th pages out of the images of the M pages.

12. The printing mediation server according to claim 11, wherein the receiving of the stop notification comprises:

receiving the stop notification and second status information representing that the printing of the images of the first to N-th page completes, the stop notification and the second status information being transmitted from the first printer, and wherein the transmitting of the first status information comprises:

transmitting, after the stop notification and the second status information are received from the first printer, the second print data and the first status information determined according to the second status information to the second printer.

13. A non-transitory computer-readable medium having a computer program stored thereon and readably by a computer of a mobile terminal device, the computer program, when executed by the computer, causes the mobile terminal device to perform operations comprising:

transmitting first print data representing images of M pages to a printing mediation server, the parameter "M" being an integer equal to or greater than 2, and the first print data being transmitted from the printing mediation server to a first printer;

transmitting, to the first printer, a stop instruction for stopping printing based on the first print data, after the first print data is transmitted to the printing mediation server, the first printer completing printing of images of first to N-th pages out of the images of the M pages until the printing based on the first print data is stopped in response to the stop instruction, and the first printer not performing printing of images of "N+1"-th to M-th pages in response to the stop instruction, and the parameter "N" being an integer equal to or greater than 1 and smaller than the parameter "M", the stop instruction comprising an identifier of a user of the mobile terminal device; and transmitting a restart instruction for restarting printing to a second printer being different from the first printer, after the stop instruction is transmitted to the first printer, the second printer transmitting a print data request for requesting print data to the printing mediation server in response to the restart instruction, the print data request comprising the identifier received from the mobile terminal device, the second printer receiving second print data including at least partial print data representing the images of the "N+1"-th to M-th pages from the printing mediation server, and the second printer performing printing based on the second print data, the restart instruction comprising the identifier of the user of the mobile terminal device.

* * * * *